(12) United States Patent
Aoki

(10) Patent No.: US 8,101,895 B2
(45) Date of Patent: Jan. 24, 2012

(54) MEASUREMENT METHOD, MEASUREMENT APPARATUS, AND METHOD OF MANUFACTURING OPTICAL SYSTEM

(75) Inventor: Eiji Aoki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 431 days.

(21) Appl. No.: 12/471,145

(22) Filed: May 22, 2009

(65) Prior Publication Data

US 2009/0294628 A1 Dec. 3, 2009

(30) Foreign Application Priority Data

May 26, 2008 (JP) ................................. 2008-137227

(51) Int. Cl.
*G01J 1/20* (2006.01)
(52) U.S. Cl. .................................. 250/201.9; 250/201.1

(58) Field of Classification Search ............... 250/201.1, 250/201.9
See application file for complete search history.

(56) References Cited

U.S. PATENT DOCUMENTS 7,649,160 B2 * 1/2010 Colomb et al. ............ 250/201.9

FOREIGN PATENT DOCUMENTS

JP 05-223537 A 8/1993

* cited by examiner

*Primary Examiner* — Tony Ko
(74) *Attorney, Agent, or Firm* — Canon U.S.A., Inc., IP Division

(57) ABSTRACT

The present invention provides a measurement method of measuring a light beam wavefront formed by a measurement target object using a measurement apparatus which includes an optical system having a reference surface and a detection unit having a detection surface, and detects, by the detection unit, an interference pattern, between a test light beam from one of the measurement target object and a standard surface and a reference light beam from the reference surface, formed on the detection surface by the optical system.

10 Claims, 9 Drawing Sheets

1A

MEASUREMENT METHOD, MEASUREMENT APPARATUS, AND METHOD OF MANUFACTURING OPTICAL SYSTEM

BACKGROUND OF THE INVENTION

1. Field of the Invention

The present invention relates to a measurement method, a measurement apparatus, and a method of manufacturing an optical system.

2. Description of the Related Art

An interferometer has been conventionally employed in measuring the transmitted wavefront or reflected wavefront (optical characteristic) of an optical system. Since an interferometer can measure the wavefront of an optical system with high precision, it is suitable for measuring the wavefront of an optical system which requires precise control of its wavefront aberration. A projection optical system of an exposure apparatus which fabricates a micropatterned semiconductor device using photolithography is required to control its wavefront aberration on the order of sub-nanometers, so wavefront measurement using an interferometer is important, particularly in this optical system.

Also, in recent years, as the wavelength of the exposure light shortens, it is demanded to control not only the wavefront aberration of a projection optical system of an exposure apparatus but also (the influence of) flare attributed to the roughnesses of the refracting surface and reflecting surface (surface shape errors) of the optical system and the internal refractive index distribution of the optical material of the optical system. Note that flare is particularly generated due to small high-spatial-frequency undulation components of a surface shape error and the internal refractive index distribution of an optical element which constitutes the projection optical system. For this reason, to reduce such flare, it is necessary to measure a surface shape error and the internal refractive index distribution of an optical element which constitutes the projection optical system with high precision up to high-spatial-frequency components.

To measure and evaluate a surface shape error of an optical element and the transmitted wavefront of an optical system using an interferometer with high precision up to small high-spatial-frequency undulation components, it is important to separate a wavefront error (a so-called system error) unique to the interferometer (its optical system), and a shape error of a measurement target surface.

Japanese Patent Laid-Open No. 5-223537 proposes a method of separating a system error and a shape error of a measurement target surface. A wavefront average method of measuring the wavefronts a plurality of times by randomly displacing the measurement region on a measurement target surface, for example, has been proposed. A method of measuring the wavefront while a measurement target surface is rotated and shifted with respect to the optical axis of an interferometer, and separately calculating rotationally asymmetrical components and rotationally symmetrical components (to be referred to as the "rotation/shift method" hereinafter) has also been proposed.

When attention is paid to small high-spatial-frequency undulation components of the wavefront measured using an interferometer, their phase amplitudes are sufficiently small as compared with the wavelength of a light source used in the interferometer. In view of this, the conjugate relationships, via the interferometer (its optical system), of high-spatial-frequency undulation components of a wavefront error unique to the interferometer change depending on the shape of a measurement target surface, and the values of their phase amplitudes detected by a detection unit, in turn, change. In case of, for example, a Fizeau interferometer, when the distance between the Fizeau surface and the measurement target surface changes, that is, when the radius of curvature differs between individual measurement target surfaces, the optical path length from the Fizeau surface to the detection unit also changes. As a consequence, different phase amplitudes (phase amplitude characteristics) are detected in response to changes in the optical path length.

For this reason, to separate a wavefront error unique to the interferometer with high precision up to high-spatial-frequency undulation components, it is necessary to perform the wavefront average method or the rotation/shift method using a standard surface having the same radius of curvature as the measurement target surface (or using the measurement target surface) every time the measurement target surface (its shape) changes.

Unfortunately, although a plurality of wavefronts (wavefront data) to be averaged must be random in the wavefront average method, it is in practice very difficult to manufacture a reference surface compatible with variations in these wavefronts for each measurement target surface, limiting the shape of the measurement target surface. Even if such a reference surface can be manufactured, the number of times of averaging must be increased in proportion to the required calibration precision (i.e., the precision of separating a system error), considerably prolonging the measurement time.

Furthermore, both the wavefront average method and the rotation/shift method require a driving mechanism which drives measurement target surfaces having various sizes and shapes (e.g., rotationally symmetrical shapes and rotationally asymmetrical shapes) relative to the optical axis of the interferometer. The driving mechanism requires optimization of, for example, a shape error attributed to a driving error and gravitational deformation in response to a change in orientation for each measurement target surface, leading to complication of the apparatus configuration and an increase in the apparatus cost.

SUMMARY OF THE INVENTION

The present invention provides a measurement method and measurement apparatus which can measure a light beam wavefront formed by a measurement target object with high precision (e.g., up to high-spatial-frequency undulation components) in a short period of time.

According to one aspect of the present invention, there is provided a measurement method of measuring a light beam wavefront formed by a measurement target object using a measurement apparatus which includes an optical system having a reference surface and a detection unit having a detection surface, and detects, by the detection unit, an interference pattern, between a test light beam from one of the measurement target object and a standard surface and a reference light beam from the reference surface, formed on the detection surface by the optical system, the method including a first measurement step of measuring a wavefront error attributed to the optical system by arranging the standard surface and detecting an interference pattern between a test light beam from the standard surface and a reference light beam from the reference surface by the detection unit, a second measurement step of measuring a light beam wavefront formed by the measurement target object by arranging the measurement target object and detecting an interference pattern between a test light beam from the measurement target object and a reference light beam from the reference surface by the detection unit, a first calculation step of calculating a first phase transfer characteristic which is a transfer characteristic of a phase of a light beam traveling through an optical path from the standard surface to the detection unit via the reference surface, and depends on a distance between the standard surface and the reference surface, a second calculation step of calculating a second phase transfer characteristic which is a transfer characteristic of a phase of a light beam traveling through an optical path from the measurement target object to the detection unit via the reference surface, and depends on a distance between the measurement target object and the reference surface, a third calculation step of calculating a first power spectrum density by Fourier-transforming the wavefront error measured in the first measurement step, a fourth calculation step of calculating a second power spectrum density by Fourier-transforming the light beam wavefront which is formed by the measurement target object and measured in the second measurement step, a fifth calculation step of calculating a reference power spectrum density of the wavefront error attributed to the optical system in the first measurement step based on the first phase transfer characteristic calculated in the first calculation step and the first power spectrum density calculated in the third calculation step, a sixth calculation step of calculating a third power spectrum density of the wavefront error attributed to the optical system in the second measurement step based on the reference power spectrum density calculated in the fifth calculation step and the second phase transfer characteristic calculated in the second calculation step, and a correction step of correcting the light beam wavefront, which is formed by the measurement target object and measured in the second measurement step, by separating the third power spectrum density calculated in the sixth calculation step from the second power spectrum density calculated in the fourth calculation step.

Further features of the present invention will become apparent from the following description of exemplary embodiments with reference to the attached drawings.

DESCRIPTION OF THE EMBODIMENTS

Figure 1:
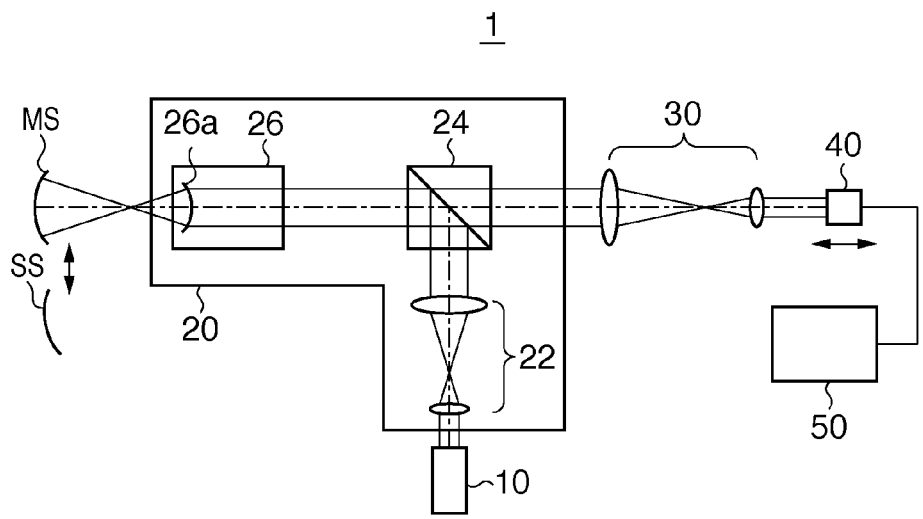
FIG. 1 is a schematic view showing a measurement apparatus according to one aspect of the present invention.

Embodiments of the present invention will be described below with reference to the accompanying drawings. Note that the same reference numerals denote the same members throughout the drawings, and a repetitive description thereof will not be given.

FIG. 1 is a schematic view showing a first embodiment of a measurement apparatus 1 according to one aspect of the present invention. The measurement apparatus 1 measures a light beam wavefront formed by a measurement target object (measurement target surface) (this wavefront will be referred to as "the wavefront of the measurement target object" hereinafter), that is, the shape (surface shape) of the measurement target object.

The measurement apparatus 1 may include as a part of the apparatus certain optical components in a configuration that is similar to that of a Fizeau interferometer, and/or may also have other components and configurations. More specifically, the measurement apparatus 1 may include a light source 10, light projecting system 20, imaging optical system 30, detection unit 40, and processing unit 50, as shown in FIG. 1. Note that the light projecting system 20 includes a beam expander 22, a beam splitter 24, and a Fizeau lens 26 having a reference surface 26a.

A light beam emitted by the light source 10 is converted into a parallel light beam having a desired beam size by the beam expander 22, and enters the beam splitter 24. The light beam reflected by the beam splitter 24 enters the Fizeau lens 26 and is split into a reference light beam and a test light beam by the reference surface 26a. More specifically, a light beam reflected by the reference surface 26a of the Fizeau lens 26 serves as a reference light beam, whereas a light beam which is transmitted through the reference surface 26a of the Fizeau lens 26 and reflected by a measurement target surface MS or a standard surface SS arranged at the position of the measurement target surface MS serves as a test light beam.

The reference light beam reflected by the reference surface 26a of the Fizeau lens 26 and the test light beam reflected by the measurement target surface MS are transmitted through the Fizeau lens 26 again, are converted into those having desired beam sizes by the imaging optical system 30, and enter the detection unit 40 having a detection surface.

On the detection surface of the detection unit 40, an interference pattern (interference fringes) corresponding to the shape of the measurement target surface MS is formed by interference (superposition) between the test light beam and the reference light beam, and is detected. At this time, the Fizeau lens 26 or the measurement target surface MS is driven by a small amount in the optical axis direction to modulate the phase of the interference pattern, thereby detecting a plurality of interference patterns having different phase modulation amounts. Note that an image sensing device, having an image sensing surface formed by a plurality of pixels, such as a CCD is used as the detection unit 40.

The interference pattern detected by the detection unit 40 is sent to the processing unit 50 and converted into a shape (shape data) of the measurement target surface MS using, for example, a phase retrieval algorithm. At this time, to measure the shape of the measurement target surface MS with high precision up to high-spatial-frequency undulation components, it is necessary to separate a wavefront error unique to the measurement apparatus 1 (its optical system) and a shape error of the measurement target surface MS up to high-spatial-frequency components. To meet this need, a wavefront error unique to the measurement apparatus 1 (its optical system) needs to be measured using a standard surface having the same radius of curvature as the measurement target surface MS (or using the measurement target surface MS), as will be explained below.

The light projecting system 20 has a common optical path including the beam expander 22, beam splitter 24, and Fizeau lens 26, as described above. A wavefront error attributed to, for example, manufacturing errors of optical elements inserted in the common optical path is split (undergoes amplitude splitting) into a reference light beam and a test light beam by the reference surface 26a. When this takes place, pieces of error information of the wavefront error propagate from the reference surface 26a as the origin to the detection unit 40 by the reference light beam and the test light beam (via different optical paths).

Figure 2:
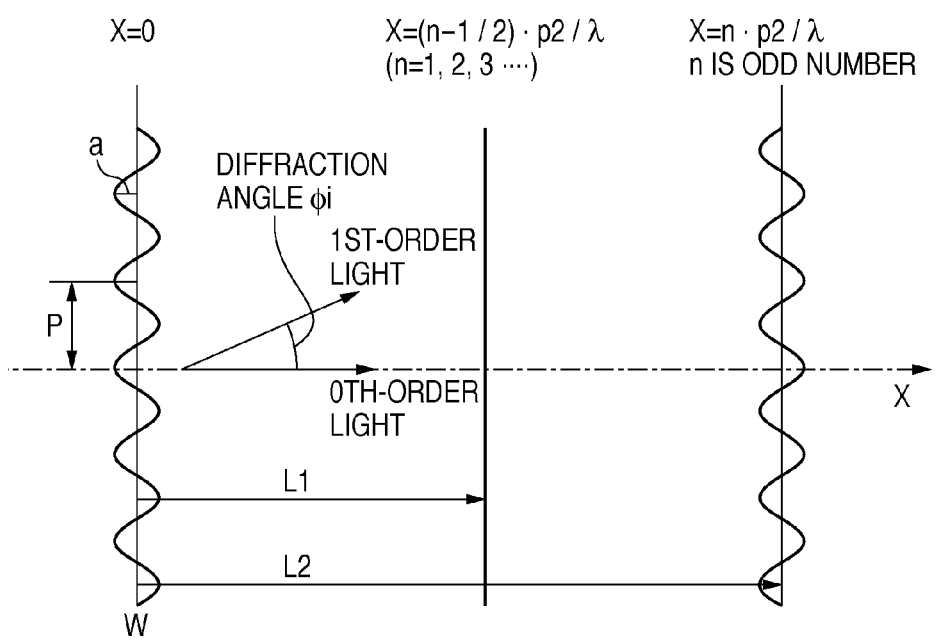
FIG. 2 is a view for explaining the propagation of weak phase components of a wavefront error.

High-spatial-frequency components (e.g., components of the 169th term or higher-order terms of Zernike polynomials), that is, weak phase components having undulation amplitudes that are sufficiently small as compared with a wavelength λ of a light beam from the light source 10 have undulation amplitudes which fluctuate depending on the distance along which they propagate through the space (propagation distance). For example, assume that a wavefront W having a spatial pitch p and an undulation amplitude a exists at X=0, as shown in FIG. 2. At a position to which the wavefront W has propagated by $X=(n-\frac{1}{2}) \cdot p^2/\lambda$ (n=1, 2, 3, . . . ), the undulation amplitude is minimum. At a position to which the wavefront W has propagated by $X=n \cdot p^2/\lambda$ (n is an odd number), the undulation amplitude is the same as that at X=0 but the undulation is n out of phase with that at X=0. At a position to which the wavefront W has propagated by $X=n \cdot p^2/\lambda$ (n is an even number), both the undulation amplitude and phase are the same as those at X=0. In this manner, the undulation amplitude periodically fluctuates depending on the propagation distance, and its fluctuation period changes depending on the spatial pitch p of the wavefront W and the wavelength λ of a light beam from the light source 10. FIG. 2 is a view for explaining the propagation of weak phase components of a wavefront error.

A measurement apparatus 1 when the measurement target surface MS has a certain radius of curvature (it is concave) will be considered next. Of a wavefront error generated in the common optical path of the light projecting system 20, attention is paid to weak phase components which have undulation amplitudes that are sufficiently small as compared with the wavelength of a light beam from the light source 10. The reference surface 26a of the Fizeau lens 26 which splits the wavefront error into a reference light beam and a test light beam is the origin of weak phase components, that is, an object point for a backward path detection optical system of the measurement apparatus 1. Note that the backward path detection optical system is configured by an optical system inserted in the optical path between the reference surface 26a of the Fizeau lens 26 and the detection unit 40. For this reason, the object point position of the backward path detection optical system configured by the Fizeau lens 26, beam splitter 24, and imaging optical system 30 differs between the optical path of the reference light beam (reference light optical path) and the optical path of the test light beam (test light optical path). As a consequence, conjugate images of the reference light beam and test light beam are formed at different positions in correspondence with a shift in the object point as well.

Figure 3A:
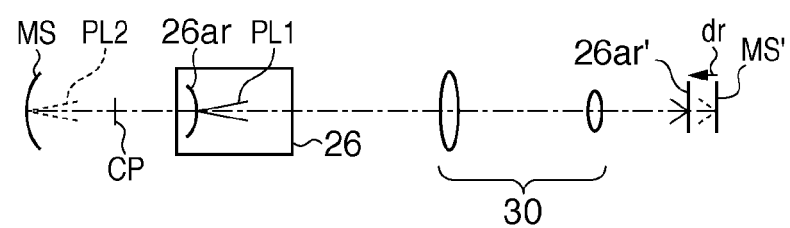
FIGS. 3A and 3B are views showing the positional relationships between reference surfaces and a measurement target surface and their conjugate image planes formed by a backward path detection optical system in a reference light optical path and a test light optical path when the measurement target surface is concave.
Figure 3B:
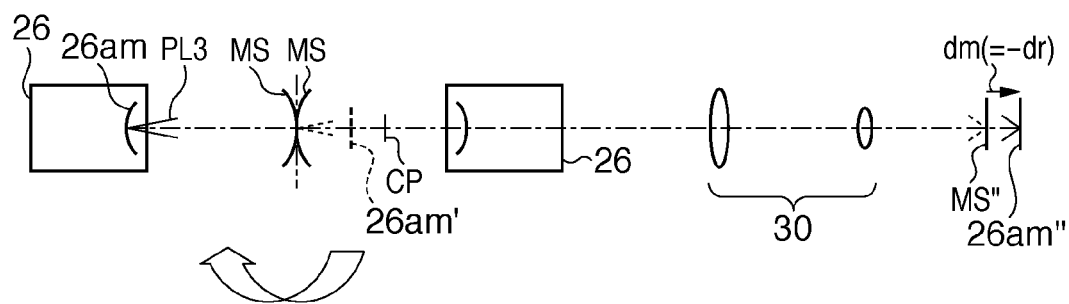

FIG. 3A is a view showing the positional relationship between a reference surface 26ar and a measurement target surface MS and their conjugate image planes formed by the backward path detection optical system in the reference light optical path when the measurement target surface MS is concave. FIG. 3B is a view showing the positional relationship between a reference surface 26am and a measurement target surface MS and their conjugate image planes formed by the backward path detection optical system in the test light optical path when the measurement target surface MS is concave, and is a developed view showing the forward path from the reference surface 26am to the measurement target surface MS. Note that the beam splitter 24 is not shown in FIGS. 3A and 3B for the sake of simplicity.

In FIG. 3A, reference symbol 26ar' denotes a conjugate image plane to the reference surface 26ar formed by the backward path detection optical system. Reference symbol MS' denotes a conjugate image plane to the measurement target surface MS formed by the backward path detection optical system. Reference symbol dr denotes the positional shift amount between the conjugate image planes 26ar' and MS' in the detection unit 40 of the measurement apparatus 1. Reference symbol PL1 denotes a paraxial ray of the reference light beam which uses the reference surface 26ar as the object plane. Reference symbol PL2 denotes a paraxial ray of the test light beam which uses the measurement target surface MS as the object plane. Reference symbol CP denotes the focal position of the light beam transmitted through the Fizeau lens 26.

In FIG. 3B, reference symbol 26am' denotes a conjugate image plane to the reference surface 26am via the measurement target surface MS. Reference symbol 26am" denotes a conjugate image plane to the conjugate image plane 26am' to the reference surface 26am formed by the backward path detection optical system. Reference symbol dm denotes the positional shift amount between the conjugate image planes 26am" and MS' in the detection unit 40 of the measurement apparatus 1. Reference symbol PL3 denotes a paraxial ray of the test light beam which uses the reference surface 26am as the object plane.

The measurement apparatus 1 serving as a Fizeau interferometer has the property of forming a conjugate image plane 26ar' to the reference surface 26ar in the reference light optical path and a conjugate image plane 26am" to the reference surface 26am in the test light optical path at positions symmetrically spaced apart from the conjugate image plane MS' to the measurement target surface MS by the same distance in the optical axis direction.

Figure 4A:
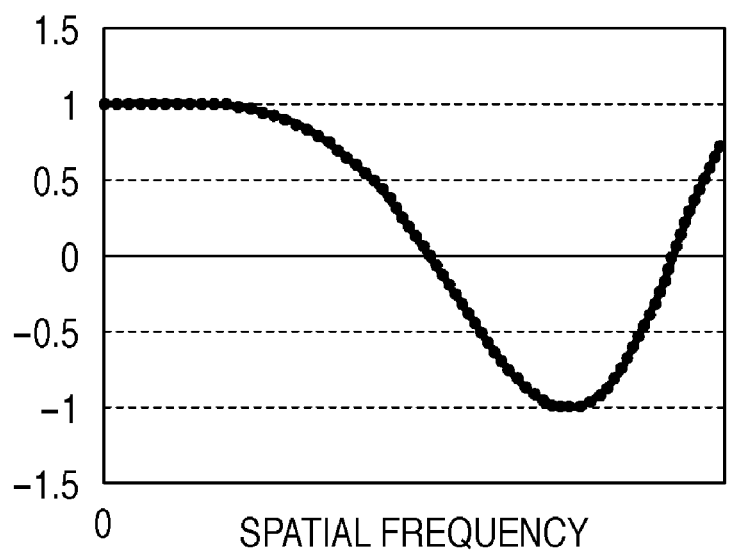
FIGS. 4A and 4B are graphs illustrating examples of a phase transfer characteristic (phase transfer function).

An undulation component while the detection unit 40 is aligned with the conjugate image plane MS' to the measurement target surface MS has a phase transfer characteristic (phase transfer function) as shown in FIG. 4A. The phase transfer characteristic means herein a characteristic obtained by calculating (phase transfer ratio)=(the undulation amplitude at a position to which the wavefront has propagated by X)/(the undulation amplitude at a position X=0, that is, on a plane adjacent to the reference surface 26a) for each spatial frequency. In FIG. 4A, the abscissa indicates the spatial frequency (the reciprocal of the spatial pitch) of the undulation amplitude, and the ordinate indicates the transfer ratio of the undulation amplitude.

Figure 5A:
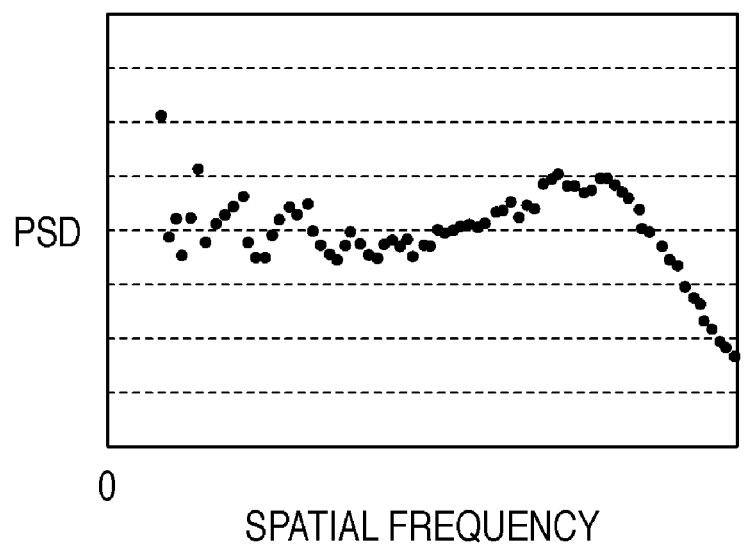
FIGS. 5A and 5B are graphs illustrating examples of a power spectrum density.

Referring to FIG. 4A, an original undulation amplitude component is reproduced or attenuates or the undulation phase is inverted depending on the spatial frequency in the detection unit 40. FIG. 5A is a graph showing a plot of the power spectrum density (PSD), which is obtained by Fourier-transforming the wavefront detected (measured) while the detection unit 40 is aligned with the conjugate image plane MS' to the measurement target surface MS, with respect to the spatial frequency. Referring to FIG. 5A, the phase difference between the test light beam and the reference light beam has a relative maximum value at a spatial frequency at which the phase transfer characteristic shown in FIG. 4A is −1. Also, the phase difference between the test light beam and the reference light beam has a relative minimum value at a spatial frequency at which the phase transfer characteristic shown in FIG. 4A is +1.

To align the detection unit 40 with the conjugate image plane MS' to the measurement target surface MS, it is only necessary to perform focus adjustment by driving the detection unit 40 in the optical axis direction through a driving system (not shown). Alternatively, focus adjustment may be performed by driving the imaging optical system 30 in the optical axis direction through a driving system (not shown) or changing the optical path length between the imaging optical system 30 and the beam splitter 24 or between the imaging optical system 30 and the detection unit 40. In this case, however, a phase transfer function needs to be calculated using an optical arrangement after the focus adjustment.

A measurement apparatus 1 when the measurement target surface MS has a certain radius of curvature (it is convex) will be considered next.

Figure 6A:
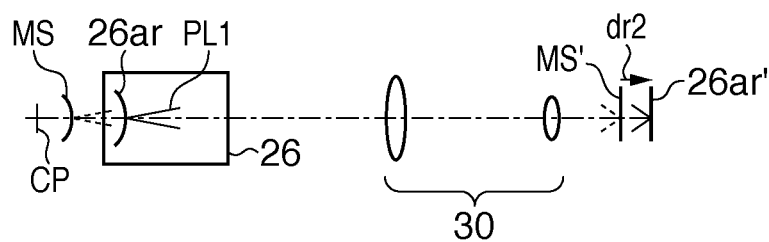
FIGS. 6A and 6B are views showing the positional relationships between reference surfaces and a measurement target surface and their conjugate image planes formed by a backward path detection optical system in a reference light optical path and a test light optical path when the measurement target surface is convex.
Figure 6B:
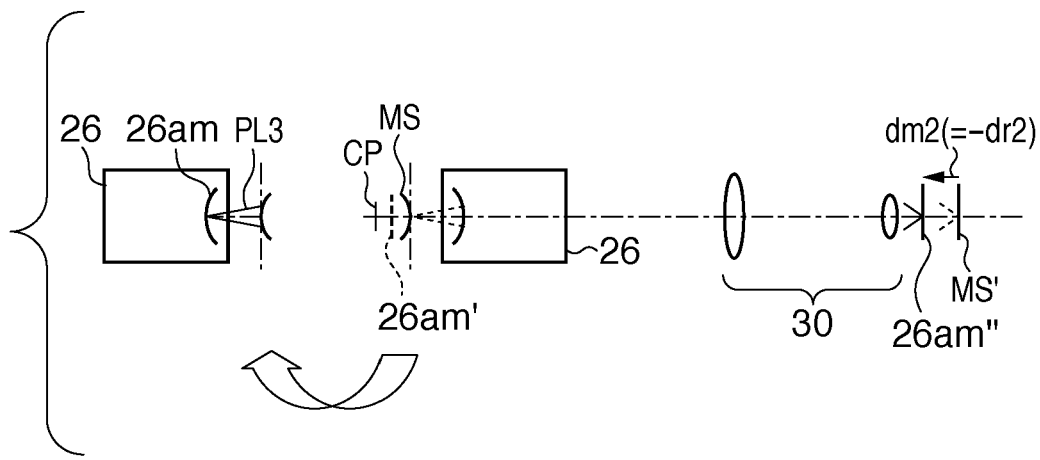

FIG. 6A is a view showing the positional relationship between a reference surface 26ar and a measurement target surface MS and their conjugate image planes formed by the backward path detection optical system in the reference light optical path when the measurement target surface MS is convex. FIG. 6B is a view showing the positional relationship between a reference surface 26am and a measurement target surface MS and their conjugate image planes formed by the backward path detection optical system in the test light optical path when the measurement target surface MS is convex, and is a developed view showing the forward path from the reference surface 26am to the measurement target surface MS.

A conjugate image plane 26ar' to the reference surface 26ar is always formed at the same position irrespective of the measurement target surface MS (its shape). However, a conjugate image plane MS' to the measurement target surface MS, and conjugate image planes 26am' and 26am'' to the reference surface 26am change in position depending on the measurement target surface MS (its shape). Accordingly, a positional shift amount dr2 between the conjugate image planes 26ar' and MS' in the detection unit 40 of the measurement apparatus 1, and a positional shift amount dm2 between the conjugate image planes 26am'' and MS' in the detection unit 40 of the measurement apparatus 1 also change.

Figure 4B:
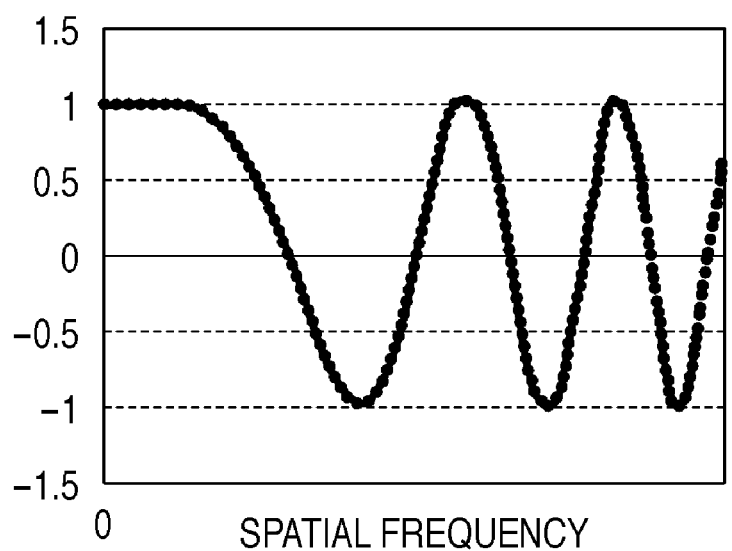
Figure 5B:
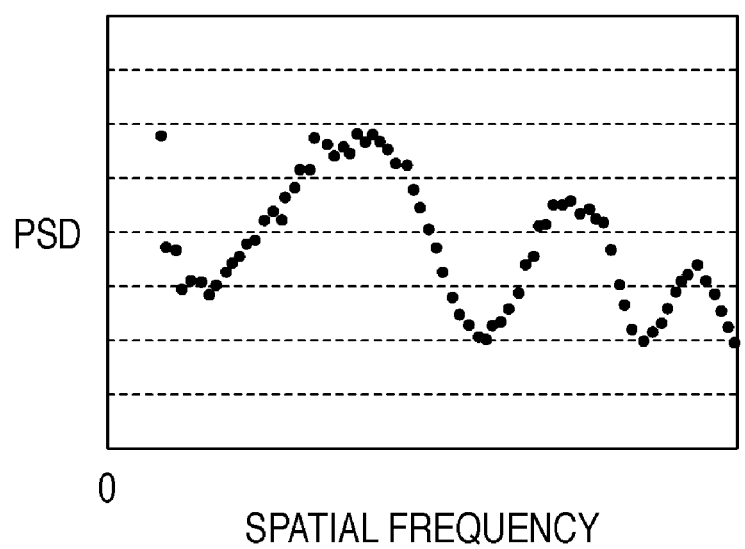

An undulation component while the detection unit 40 is aligned with the conjugate image plane MS' to the measurement target surface MS has a phase transfer characteristic (phase transfer function) as shown in FIG. 4B. FIG. 5B is a graph showing a plot of the power spectrum density (PSD), which is obtained by Fourier-transforming the wavefront detected (measured) while the detection unit 40 is aligned with the conjugate image plane MS' to the measurement target surface MS, with respect to the spatial frequency. Referring to FIGS. 4B and 5B, spatial frequencies at which the PSD has extrema correspond to the phase transfer characteristic, as in the case described above.

In this manner, when the radius of curvature differs between individual measurement target surfaces MS, that is, when the distance between the reference surface 26a and the measurement target surface MS (the interval between the reference surface 26a and the measurement target surface MS) changes depending on the shape of the measurement target surface MS, the frequency characteristics of undulation components in the test light optical path change. As a consequence, the frequency characteristics of high-spatial-frequency undulation components of a wavefront error unique to the measurement apparatus 1 change. To handle this situation, it is necessary to precisely measure a wavefront error of the measurement apparatus 1, which changes for each measurement target surface MS, and to separate (eliminate) the measured wavefront error. However, measurement for separating (eliminating) the wavefront error for each measurement target surface MS considerably prolongs the measurement time. Furthermore, depending on the shape of the measurement target surface MS (the size of the measurement target object), measurement for separating (eliminating) the wavefront error often cannot be performed due to physical limitations involved.

Figure 7:
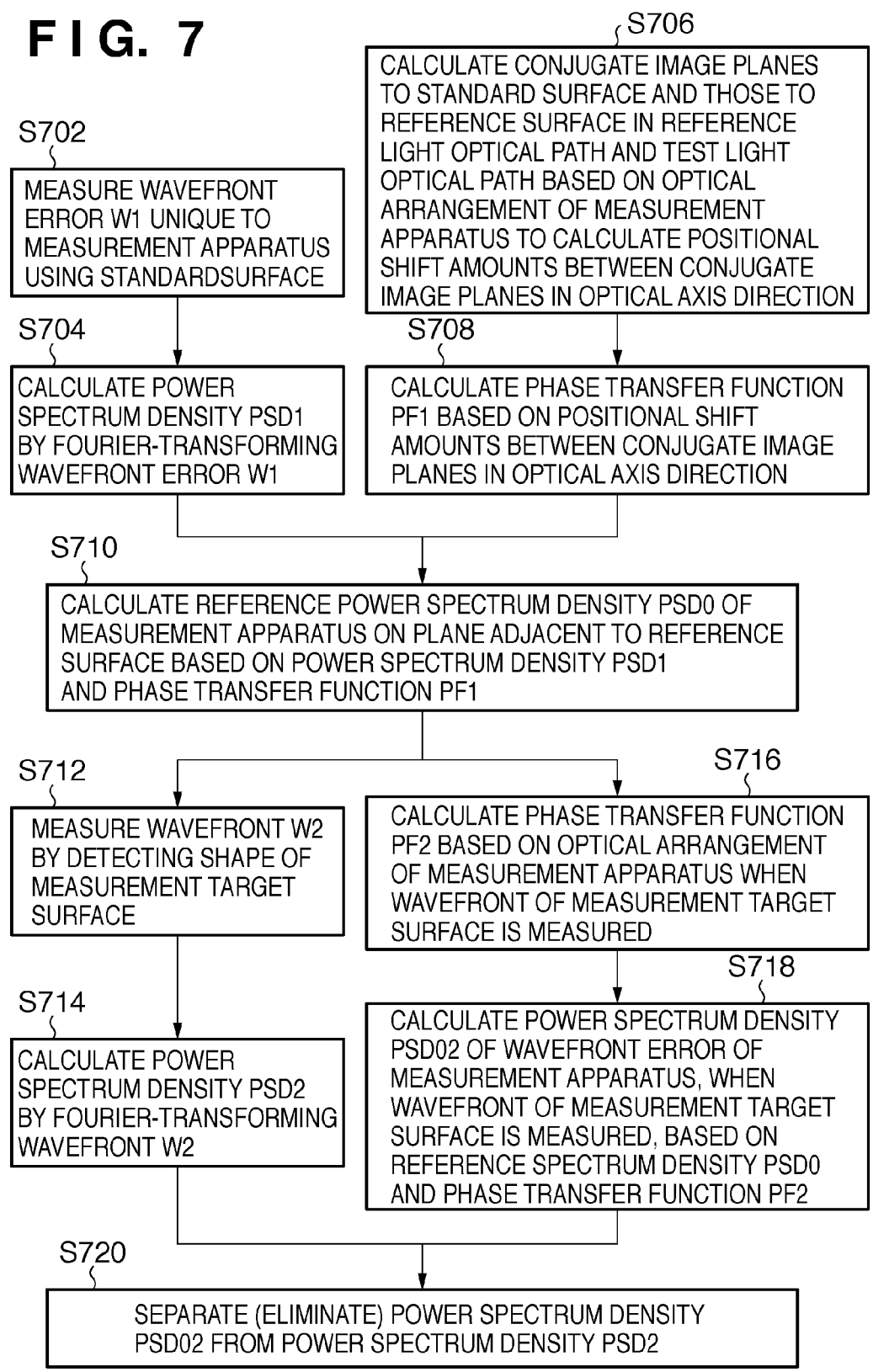
FIG. 7 is a flowchart for explaining a measurement method according to one aspect of the present invention.

To overcome these shortcomings, the measurement apparatus 1 performs a measurement method shown in the flowchart of FIG. 7. This measurement method is used to measure the wavefront (shape) of the measurement target surface MS, and can obviate the need to measure a wavefront error unique to the measurement apparatus 1 for each measurement target surface MS by calibrating (separating) undulation components of the wavefront error. Also, the measurement method shown in the flowchart of FIG. 7 is performed by systematically controlling each unit of the measurement apparatus 1 by the processing unit 50 which functions as a control unit as well as its primary role. This means that the processing unit 50 not only performs processes associated with calculation of the wavefront of the measurement target surface MS but also controls the overall measurement apparatus 1. For example, the processing unit 50 performs control so as to measure a wavefront error of the measurement apparatus 1 by arranging the standard surface SS and detecting, by the detection unit 40, an interference pattern between a test light beam from the standard surface SS and a reference light beam from the reference surface 26a. Likewise, the processing unit 50 performs control so as to measure the wavefront of the measurement target surface MS by arranging the measurement target surface MS and detecting, by the detection unit 40, an interference pattern between a test light beam from the measurement target surface MS and a reference light beam from the reference surface 26a.

In step S702 (first measurement step), a wavefront error W1 of the measurement apparatus 1 is measured by arranging the standard surface SS at the position at which the measurement target surface MS is to be arranged (i.e., by using the standard surface). A wavefront error is measured by, for example, the wavefront average method or the rotation/shift method (a method of measuring a wavefront error while rotating or shifting the standard surface).

In step S704 (third calculation step), a power spectrum density (first power spectrum density) PSD1 (a power spectrum density as shown in FIG. 5A) is calculated by Fourier-transforming the wavefront error W1 measured in step S702.

In step S706, conjugate image planes to the reference surface 26a (their positions) and those to the standard surface SS in the reference light optical path and test light optical path are calculated based on the optical arrangement of the measurement apparatus 1 when the wavefront error W1 is measured using the standard surface SS. The positional shift amounts between the conjugate image planes in the optical axis direction in the detection unit 40 of the measurement apparatus 1 (e.g., positional shift amounts dr and dm as shown in FIGS. 3A and 3B) are calculated. Note that the optical arrangement of the measurement apparatus 1 when the wavefront error W1 is measured using the standard surface SS means the arrangement of an optical system (note that it includes, e.g., the standard surface and the detection unit 40) which constitutes the measurement apparatus 1 in step S702.

In step S708 (first calculation step), a phase transfer function PF1 (e.g., a phase transfer function as shown in FIG. 4A) of an undulation component of the wavefront error W1 when it is measured using the standard surface is calculated for each spatial-frequency component. At this time, a phase transfer function PF1 is calculated based on the positional shift amounts between the conjugate image planes calculated in step S706. Note that the phase transfer function (first phase transfer characteristic) PF1 is the transfer characteristic of the phase of a light beam traveling through the optical path from the standard surface SS to the detection unit 40 via the reference surface 26a, and depends on the distance between the standard surface SS and the reference surface 26a.

Steps S706 and S708 may be performed parallel to steps S702 and S704, or may be performed before steps S702 and S704.

Figure 8:
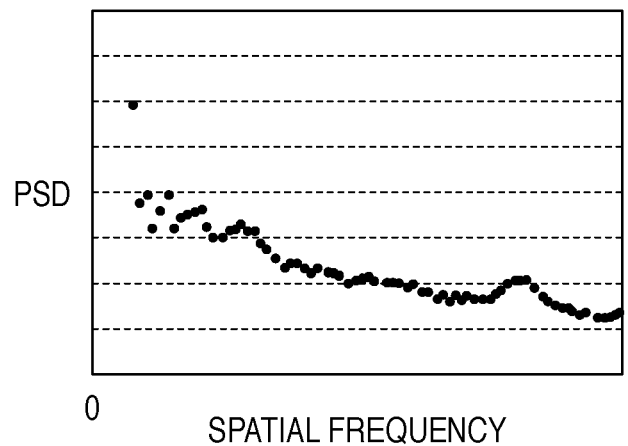
FIG. 8 is a graph illustrating an example of a reference power spectrum density calculated in step S710 of FIG. 7.

In step S710 (fifth calculation step), a reference power spectrum density PSD0 of a wavefront error of the measurement apparatus 1 on a plane adjacent to the reference surface 26a is calculated. More specifically, a reference power spectrum density PSD0 is calculated based on the power spectrum density PSD1 and phase transfer function PF1 calculated in steps S704 and S708, respectively. FIG. 8 shows an example of a reference power spectrum density PSD0 calculated in step S710.

In step S712 (second measurement step), a wavefront W2 is measured by exchanging the standard surface SS with the measurement target surface MS (i.e., by arranging the measurement target surface MS) and detecting the shape (surface shape) of the measurement target surface MS. Note that the measurement target surface MS may have a radius of curvature and a shape that are different from those of the standard surface SS.

In step S714 (fourth calculation step), a power spectrum density (second power spectrum density) PSD2 is calculated by Fourier-transforming the wavefront W2 measured in step S712.

In step S716 (second calculation step), a phase transfer function PF2 (e.g., a phase transfer function as shown in FIG. 4B) when the wavefront W2 of the measurement target surface MS is measured is calculated based on the optical arrangement of the measurement apparatus 1 when the wavefront W2 of the measurement target surface MS is measured. However, a phase transfer function PF2 may be calculated (estimated) from the spatial frequency characteristic of the power spectrum density PSD2, which is obtained by Fourier-transforming the wavefront W2 of the measurement target surface MS. Note that the phase transfer function (second phase transfer function) PF2 is the transfer characteristic of the phase of a light beam traveling through the optical path from the measurement target surface MS to the detection unit 40 via the reference surface 26a, and depends on the distance between the measurement target surface MS and the reference surface 26a.

In step S718 (sixth calculation step), a power spectrum density (third power spectrum density) PSD02 (a power spectrum density as shown in FIG. 5B) of an undulation component of a wavefront error of the measurement apparatus 1 when the wavefront W2 of the measurement target surface MS is measured is calculated. More specifically, a power spectrum density PSD02 is calculated based on the reference power spectrum density PSD0 and phase transfer function PF2 calculated in steps S710 and S716, respectively.

In step S720 (correction step), the power spectrum density PSD02 calculated in step S718 is separated (eliminated) from the power spectrum density PSD2 calculated in step S714. In other words, the wavefront W2 of the measurement target surface MS measured in step S712 is corrected by separating the power spectrum density PSD02 from the power spectrum density PSD2.

In this manner, the above-mentioned measurement method can separate high-spatial-frequency undulation components of the measurement target surface MS and undulation components of a wavefront error unique to the measurement apparatus 1 to extract the undulation components of the measurement target surface MS alone. In addition, once a wavefront error of the measurement apparatus 1 is measured up to high spatial frequencies using one or more standard surfaces, undulation components of the measurement target surface MS alone can be extracted even when the radius of curvature and the shape of the measurement target surface MS have changed. More specifically, by, for example, ray tracing using the contour data of the measurement target surface MS and the optical arrangement of the measurement apparatus 1 (design data of an optical system), the phase transfer function of a high-spatial-frequency undulation component and the frequency characteristic of a wavefront error of the measurement apparatus 1 when the measurement target surface MS is measured are calculated and separated (eliminated).

Although a wavefront error of the measurement apparatus 1 is measured using one or more standard surfaces herein, undulation components of the measurement target surface MS alone can be similarly extracted by measuring a wavefront error of the measurement apparatus 1 using the measurement target surface MS as a standard surface.

In this manner, the measurement apparatus 1 and measurement method according to the first embodiment can measure a light beam wavefront formed by a measurement target object with high precision (e.g., up to high-spatial-frequency undulation components) in a short period of time.

Figure 9:
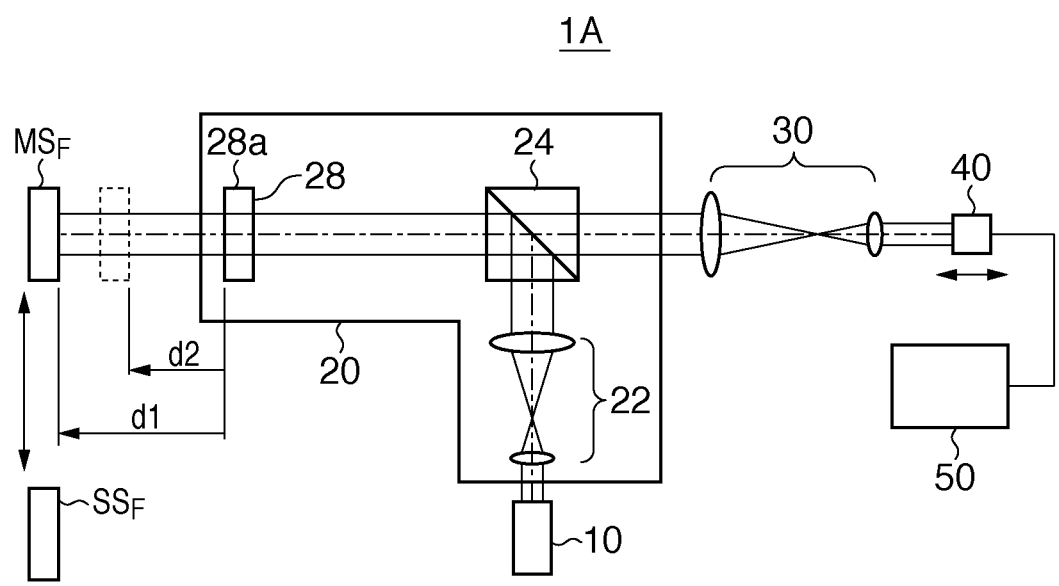
FIG. 9 is a schematic view showing a measurement apparatus according to one aspect of the present invention.

A measurement apparatus 1A which measures the wavefront (shape) of a flat measurement target surface $MS_F$, as shown in FIG. 9, will be explained in the second embodiment.

The measurement apparatus 1A may include as a part of the apparatus certain optical components in a configuration that is similar to that of a Fizeau interferometer, and/or may also have other components and configurations. More specifically, the measurement apparatus 1A may include a light source 10, light projecting system 20, imaging optical system 30, detection unit 40, and processing unit 50, as shown in FIG. 9. Note that the light projecting system 20 includes a beam expander 22, a beam splitter 24, and a transmission flat lens 28 having a reference surface 28a.

A light beam emitted by the light source 10 is converted into a parallel light beam having a desired beam size by the beam expander 22, and enters the beam splitter 24. The light beam reflected by the beam splitter 24 enters the transmission flat lens 28 and is split into a reference light beam and a test light beam by the reference surface 28a. More specifically, a light beam reflected by the reference surface 28a of the transmission flat lens 28 serves as a reference light beam, whereas a light beam which is transmitted through the reference surface 28a of the transmission flat lens 28 and reflected by the measurement target surface $MS_F$ or a standard surface $SS_F$ arranged at the position of the measurement target surface $MS_F$ serves as a test light beam.

A measurement method for the measurement apparatus 1A will be explained below. This measurement method is used to measure the wavefront (shape) of the measurement target surface $MS_F$, and can obviate the need to measure a wavefront error unique to the measurement apparatus 1A for each measurement target surface $MS_F$ by calibrating (separating) undulation components of the wavefront error. Also, this measurement method is performed by systematically controlling each unit of the measurement apparatus 1A by the processing unit 50 which functions as a control unit as well as its primary role.

First, a wavefront error W31 unique to the measurement apparatus 1A is measured by arranging the standard surface $SS_F$ at a position spaced apart from the reference surface 28a of the transmission flat lens 28 by a distance d1 (i.e., by using the standard surface $SS_F$).

Second, a wavefront error W32 unique to the measurement apparatus 1A is measured by arranging the standard surface $SS_F$ at a position space apart from the reference surface 28a of the transmission flat lens 28 by a distance d2.

Third, power spectrum densities PSD31 and PSD32 are calculated by Fourier-transforming the wavefront errors W31 and W32, respectively.

Figure 10:
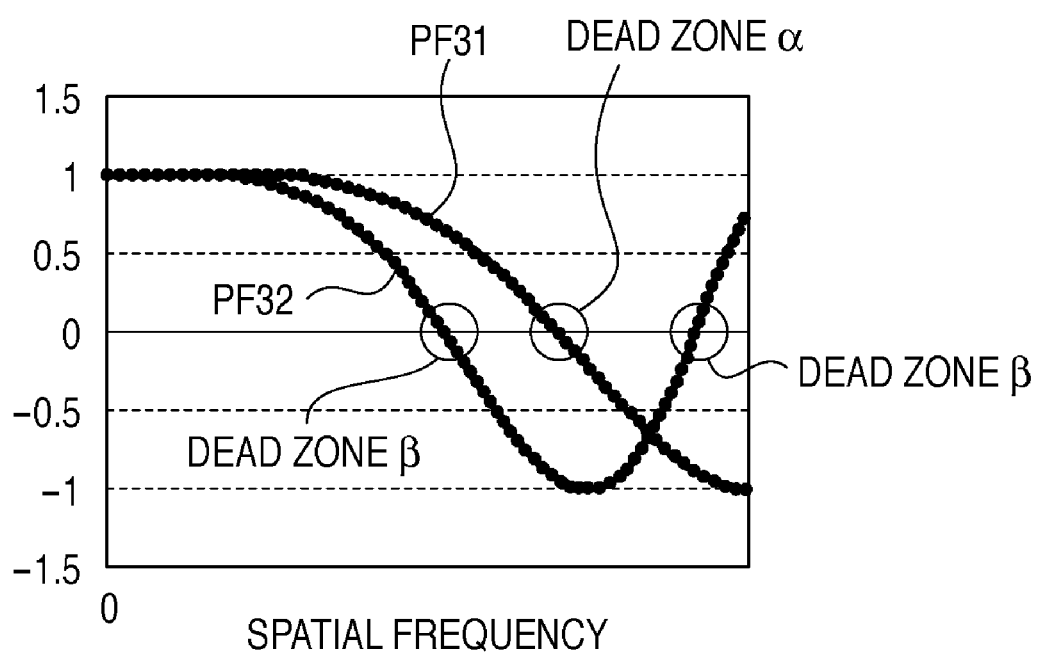
FIG. 10 is a graph illustrating an example of phase transfer functions calculated by the measurement apparatus shown in FIG. 9.

Also, a phase transfer function PF31 of a high-spatial-frequency component when the standard surface $SS_F$ is arranged at a position spaced apart from the transmission flat lens 28 by the distance d1 is calculated. Likewise, a phase transfer function PF32 of a high-spatial-frequency component when the standard surface $SS_F$ is arranged at a position spaced apart from the transmission flat lens 28 by the distance d2 is calculated. Phase transfer functions PF31 and PF32 can be calculated from the optical arrangement of the measurement apparatus 1A when the standard surface SSF is arranged at a position spaced apart from the transmission flat lens 28 by the distance d1 or d2, as described above. FIG. 10 shows an example of the thus calculated phase transfer functions PF31 and PF32. Then, a reference power spectrum density PSD03 is calculated based on the power spectrum densities PSD31 and PSD32 and the phase transfer functions PF31 and PF32.

The reason why wavefront errors W31 and W32 unique to the measurement apparatus 1A are measured by arranging the standard surface $SS_F$ at two positions (positions spaced apart from the reference surface 28a by the distances d1 and d2) will be given herein. Only measuring a wavefront error W31 unique to the measurement apparatus 1A by arranging the standard surface $SS_F$ at a position spaced apart from the reference surface 28a by the distance d1 is insufficient to calculate a reference power spectrum density PSD03 at the spatial frequencies in a dead zone α of the phase transfer function PF31 shown in FIG. 10. To achieve this operation, a wavefront error of the measurement apparatus 1A is measured by setting the distances d1 and d2 so that dead zones α and β in which the phase transfer characteristics of the phase transfer functions PF31 and PF32 shown in FIG. 10 are zero are not obtained at the same spatial frequency. This makes it possible to calculate a reference power spectrum density PSD03 by complementing the dead zones α and β of the phase transfer functions PF31 and PF32.

Lastly, a wavefront W33 is measured by arranging the measurement target surface $MS_F$ at a position spaced apart from the reference surface 28a of the transmission flat lens 28 by the distance d1 and detecting the shape (surface shape) of the measurement target surface MSF. Also, a power spectrum density PSD033 of an undulation component of a wavefront error of the measurement apparatus 1A when the measurement target surface $MS_F$ is measured is calculated based on the reference power spectrum density PSD03 and the phase transfer function PF31. The power spectrum density PSD033 is separated (eliminated) from a power spectrum density PSD_W33 obtained by Fourier-transforming the wavefront W33 of the measurement target surface $MS_F$.

Note that a reference power spectrum density PSD03 may be calculated using the measurement target surface $MS_F$ in place of the standard surface $SS_F$. Note also that the measurement target surface $MS_F$ is arranged at a position spaced apart from the reference surface 28a of the transmission flat lens 28 by the distance d1 herein. However, high-spatial-frequency components of a wavefront error unique to the measurement apparatus 1A can be separated (eliminated) even when the measurement target surface $MS_F$ is arranged at a position spaced apart from the reference surface 28a by an arbitrary distance as long as a power spectrum density is calculated using a phase transfer function in this arrangement.

In this manner, the measurement apparatus 1A and measurement method according to the second embodiment can measure a light beam wavefront formed by a measurement target object with high precision (e.g., up to high-spatial-frequency undulation components) in a short period of time.

Figure 11:
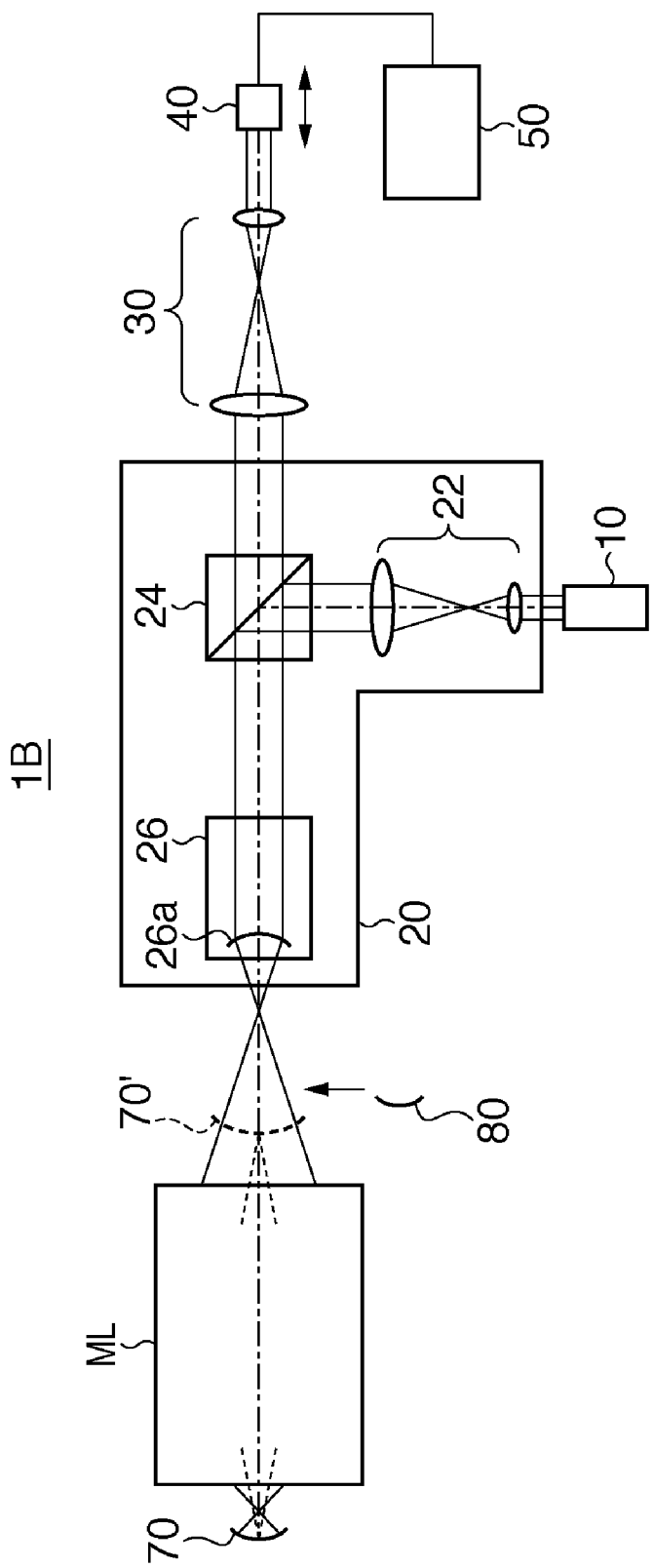
FIG. 11 is a schematic view showing a measurement apparatus according to one aspect of the present invention.

A measurement apparatus 1B which measures a light beam wavefront (transmitted wavefront aberration) formed by a measurement target lens ML serving as a transmission optical system, as shown in FIG. 11, will be explained in the third embodiment.

The measurement apparatus 1B may include as a part of the apparatus certain optical components in a configuration that is similar to that of a Fizeau interferometer, and/or may also have other components and configurations. More specifically, the measurement apparatus 1B may include a light source 10, light projecting system 20, imaging optical system 30, detection unit 40, processing unit 50, and reflecting mirrors 70 and 80, as shown in FIG. 11. Note that the light projecting system 20 includes a beam expander 22, a beam splitter 24, and a Fizeau lens 26 having a reference surface 26a.

The measurement apparatus 1B includes reflecting mirrors 70 and 80 in order to measure the wavefront aberrations of the measurement target lens ML in the forward and backward optical paths. A light beam transmitted through the Fizeau lens 26 enters the measurement target lens ML. The light beam having passed through the measurement target lens ML is reflected by the reflecting mirror 70 back to the Fizeau lens 26 upon passing through the measurement target lens ML again. To measure only the wavefront aberration of the measurement target lens ML with high precision up to high spatial frequencies, it is necessary to separate a wavefront error (wavefront aberration) unique to the measurement apparatus 1B and the wavefront aberration of the measurement target lens ML. To meet this need, a wavefront error (wavefront aberration) unique to the measurement apparatus 1B is measured by arranging the reflecting mirror 80 at the position of a conjugate image plane 70' to the reflecting mirror 70 via the measurement target lens ML. With this operation, the wavefront phase of a wavefront error (wavefront aberration) unique to the measurement apparatus 1B is maintained between the reflecting mirrors 70 and 80. This makes it possible to separate a wavefront error (wavefront aberration) unique to the measurement apparatus 1B with high precision.

However, even when the reflecting mirrors 70 and 80 are not conjugate to each other via the measurement target lens ML, a wavefront error (wavefront aberration) unique to the measurement apparatus 1B can be separated with high precision in the third embodiment.

A measurement method for the measurement apparatus 1B will be explained below. This measurement method is used to measure the wavefront (transmitted wavefront aberration) of the measurement target lens ML, and is performed by systematically controlling each unit of the measurement apparatus 1B by the processing unit 50 which functions as a control unit as well as its primary role.

First, the reflecting mirror 80 is arranged to face the Fizeau lens 26. Note that the reflecting mirror 80 is not aligned with the position of the conjugate image plane 70' to the reflecting mirror 70 via the measurement target lens ML, and is arranged at a position shifted from the conjugate image plane 70' in the optical axis direction. In this state (i.e., using the reflecting mirror 80), wavefront data W41 unique to the measurement apparatus 1B is measured.

Second, a power spectrum density PSD41 is calculated by Fourier-transforming the wavefront data W41. Also, a phase transfer function PF41 of a high-spatial-frequency component when the wavefront data W41 is measured is calculated based on the optical arrangement of the measurement apparatus 1B that includes the reflecting mirror 80. In addition, a reference power spectrum PSD04 is calculated based on the power spectrum density PSD41 and the phase transfer function PF41.

Third, a phase transfer function PF42 when the reflecting mirror 80 is arranged at the position of the conjugate image plane 70' to the reflecting mirror 70 via the measurement target lens ML is calculated. A power spectrum density PSD042 of an undulation component of a wavefront error unique to the measurement apparatus 1B when the transmitted wavefront of the measurement target lens ML is measured is calculated based on the reference power spectrum density PSD04 and the phase transfer function PF42.

Lastly, the reflecting mirror 80 is retracted from the optical path of the measurement apparatus 1B, and a wavefront (transmitted wavefront) W42 of the measurement target lens ML is measured using the reflecting mirror 70. The power spectrum density PSD042 is separated (eliminated) from a power spectrum density PSD42 obtained by Fourier-transforming the wavefront W42 of the measurement target lens ML.

In this manner, even when the transmitted wavefront of the measurement target lens ML is measured, high-spatial-frequency undulation components attributed to the measurement target lens ML alone can be extracted by separating (eliminating) a wavefront error of the measurement apparatus 1B with high precision.

In this manner, the measurement apparatus 1B and measurement method according to the third embodiment can measure a light beam wavefront (transmitted wavefront aberration) formed by the measurement target lens ML with high precision (e.g., up to high-spatial-frequency undulation components) in a short period of time.

A method of manufacturing a projection optical system for use in an exposure apparatus will be explained in the fourth embodiment. The projection optical system includes a plurality of optical elements such as lenses and mirrors.

First, the shape (wavefront) of an optical element which constitutes a projection optical system is measured with high precision up to high-spatial-frequency components using the measurement apparatus 1 and measurement method according to the first embodiment and the measurement apparatus 1A and measurement method according to the second embodiment. The shape of the optical element is processed so as to reduce a shape error of the optical element based on the measurement results obtained by the measurement apparatus 1 and measurement method according to the first embodiment and the measurement apparatus 1A and measurement method according to the second embodiment. Note that the measurement and processing of the shape of the optical element are repeated until the shape error of the optical element decreases to a desired standard value or less. A projection optical system is assembled by combining optical elements having shape errors equal to or less than a desired standard value.

Next, the transmitted wavefront (wavefront aberration) of the assembled projection optical system is measured with high precision up to high-spatial-frequency components using the measurement apparatus 1B and measurement method according to the third embodiment. The intervals between optical elements which constitute the projection optical system and decenterings of the optical elements are adjusted so as to reduce the wavefront aberration of the projection optical system based on the measurement result obtained by the measurement apparatus 1B and measurement method according to the third embodiment. Note that the measurement and adjustment of the transmitted wavefront (wavefront aberration) of the projection optical system are repeated until the wavefront aberration decreases to a desired standard value or less.

The use of the measurement apparatuses and measurement methods according to the first, second, and third embodiments allows the measurement of the wavefront aberration of a projection optical system with high precision up to high-spatial-frequency undulation components. Hence, a projection optical system with an excellent imaging performance can be manufactured. Also, an exposure apparatus which uses such a projection optical system attains an excellent exposure performance, and therefore provides high-quality devices (e.g., a semiconductor device and a liquid crystal display device) with a high throughput and good economical efficiency. The devices are fabricated by a step of exposing a substrate (e.g., a wafer or a glass plate) coated with a resist (photosensitive agent) using the exposure apparatus, a step of developing the exposed substrate, and other known steps.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2008-137227 filed on May 26, 2008, which is hereby incorporated by reference herein in its entirety.

What is claimed is:

1. A measurement method of measuring a light beam wavefront formed by a measurement target object using a measurement apparatus which includes an optical system having a reference surface and a detection unit having a detection surface, and detects, by the detection unit, an interference pattern, between a test light beam from one of the measurement target object and a standard surface and a reference light beam from the reference surface, formed on the detection surface by the optical system, the method comprising:

a first measurement step of measuring a wavefront error attributed to the optical system by arranging the standard surface and detecting an interference pattern between a test light beam from the standard surface and a reference light beam from the reference surface by the detection unit;

a second measurement step of measuring a light beam wavefront formed by the measurement target object by arranging the measurement target object and detecting an interference pattern between a test light beam from the measurement target object and a reference light beam from the reference surface by the detection unit;

a first calculation step of calculating a first phase transfer characteristic which is a transfer characteristic of a phase of a light beam traveling through an optical path from the standard surface to the detection unit via the reference surface, and depends on a distance between the standard surface and the reference surface;

a second calculation step of calculating a second phase transfer characteristic which is a transfer characteristic of a phase of a light beam traveling through an optical path from the measurement target object to the detection unit via the reference surface, and depends on a distance between the measurement target object and the reference surface;

a third calculation step of calculating a first power spectrum density by Fourier-transforming the wavefront error measured in the first measurement step;

a fourth calculation step of calculating a second power spectrum density by Fourier-transforming the light beam wavefront which is formed by the measurement target object and measured in the second measurement step;

a fifth calculation step of calculating a reference power spectrum density of the wavefront error attributed to the optical system in the first measurement step based on the first phase transfer characteristic calculated in the first calculation step and the first power spectrum density calculated in the third calculation step;

a sixth calculation step of calculating a third power spectrum density of the wavefront error attributed to the optical system in the second measurement step based on the reference power spectrum density calculated in the fifth calculation step and the second phase transfer characteristic calculated in the second calculation step; and a correction step of correcting the light beam wavefront, which is formed by the measurement target object and measured in the second measurement step, by separating the third power spectrum density calculated in the sixth calculation step from the second power spectrum density calculated in the fourth calculation step.

2. The method according to claim 1, wherein
the first power spectrum density, the second power spectrum density, and the third power spectrum density are calculated for each spatial frequency, and
in the correction step, the wavefront of the measurement target object is corrected for said each spatial frequency.

3. The method according to claim 1, wherein in the first measurement step, the distance between the reference surface and the standard surface is set so as not to generate a dead zone in the first phase transfer characteristic calculated in the first calculation step.

4. The method according to claim 1, wherein
in the first calculation step, the first phase transfer characteristic is calculated based on an arrangement of the standard surface, the reference surface, the optical system, and the detection unit in the first measurement step, and
in the second calculation step, the second phase transfer characteristic is calculated based on an arrangement of the measurement target object, the reference surface, the optical system, and the detection unit in the second measurement step.

5. The method according to claim 1, wherein
in the first calculation step, the first phase transfer characteristic is calculated based on a power spectrum density of a light beam wavefront formed by the standard surface, and
in the second calculation step, the second phase transfer characteristic is calculated based on a power spectrum density of a light beam wavefront formed by the measurement target object.

6. The method according to claim 1, wherein the measurement target object has one of a convex surface, a concave surface, and a flat surface.

7. The method according to claim 1, wherein the measurement target object includes a transmission optical system.

8. A measurement apparatus which includes an optical system having a reference surface and a detection unit having a detection surface, and measures a light beam wavefront formed by a measurement target object by detecting, by the detection unit, an interference pattern, between a test light beam from one of the measurement target object and a standard surface and a reference light beam from the reference surface, formed on the detection surface by the optical system, the apparatus comprising:

a control unit configured to perform control so as to measure a wavefront error attributed to the optical system by arranging the standard surface and detecting an interference pattern between a test light beam from the standard surface and a reference light beam from the reference surface by the detection unit, and so as to measure a light beam wavefront formed by the measurement target object by arranging the measurement target object and detecting an interference pattern between a test light beam from the measurement target object and a reference light beam from the reference surface by the detection unit; and a processing unit configured to perform a process associated with calculation of the light beam wavefront formed by the measurement target object, wherein said processing unit calculates a first phase transfer characteristic which is a transfer characteristic of a phase of a light beam traveling through an optical path from the standard surface to the detection unit via the reference surface, and depends on a distance between the standard surface and the reference surface, calculates a second phase transfer characteristic which is a transfer characteristic of a phase of a light beam traveling through an optical path from the measurement target object to the detection unit via the reference surface, and depends on a distance between the measurement target object and the reference surface, calculates a first power spectrum density by Fourier-transforming the wavefront error measured, calculates a second power spectrum density by Fourier-transforming the light beam wavefront which is formed by the measurement target object and measured, calculates a reference power spectrum density, when the wavefront error attributed to the optical system is measured, based on the first phase transfer characteristic and the first power spectrum density, calculates a third power spectrum density of the wavefront error attributed to the optical system, when the light beam wavefront formed by the measurement target object is measured, based on the reference power spectrum density and the second phase transfer characteristic, and corrects the light beam wavefront, which is formed by the measurement target object and measured, by separating the third power spectrum density from the second power spectrum density.

9. A method of manufacturing an optical system including a plurality of optical elements, the method comprising:

a measurement step of measuring light beam wavefronts formed by the plurality of optical elements using the measurement method defined in claim 1;

a processing step of processing the plurality of optical elements so as to reduce errors of the light beam wavefronts, which is formed by the plurality of optical elements, based on the measurement results obtained in the measurement step; and a manufacturing step of manufacturing an optical system by assembling the plurality of optical elements processed in the processing step.

10. A method of manufacturing an optical system including a plurality of optical elements, the method comprising:

a measurement step of measuring a light beam wavefront formed by the optical system using the measurement method defined in claim 1; and an adjustment step of adjusting at least one of intervals between the plurality of optical elements and decenterings of the plurality of optical elements so as to reduce an error of the light beam wavefront, which is formed by the optical system, based on the measurement result obtained in the measurement step.

* * * * *